(12) United States Patent
Gouge, Jr.

(10) Patent No.: US 6,218,746 B1
(45) Date of Patent: Apr. 17, 2001

(54) CORDLESS MULTI-PURPOSE HIGH TORQUE GENERATING ASSEMBLY

(76) Inventor: Lloyd V. Gouge, Jr., 2122 Rolling Oak La., Garland, TX (US) 75044

( * ) Notice: Subject to any disclaimer, the term of this patent is extended or adjusted under 35 U.S.C. 154(b) by 0 days.

(21) Appl. No.: 09/337,364

(22) Filed: Jun. 21, 1999

Related U.S. Application Data

(63) Continuation-in-part of application No. 09/048,516, filed on Mar. 26, 1998.

(51) Int. Cl.[7] ................................................... H02K 7/14
(52) U.S. Cl. .......................... 310/50; 310/47; 310/75 R; 310/83
(58) Field of Search ........................... 310/47, 50, 75 R, 310/83, 48, 73 R

(56) References Cited

U.S. PATENT DOCUMENTS

| D. 257,349 | 10/1980 | Thomas | D14/40 |
|---|---|---|---|
| 1,768,083 | 6/1930 | Lansing . | |
| 2,172,126 | 9/1939 | Lansing | 123/179 |
| 3,190,276 | 6/1965 | Diggs | 123/179 |
| 3,939,369 | 2/1976 | Sullivan | 310/89 |
| 4,078,589 * | 3/1978 | Miller | 144/32 R |
| 4,081,704 * | 3/1978 | Vassos et al. | 310/50 |
| 4,084,123 * | 4/1978 | Lineback et al. | 310/2 |
| 4,299,004 * | 11/1981 | Lancaster | 15/97 R |
| 4,347,450 | 8/1982 | Colligan | 310/50 |
| 4,810,916 | 3/1989 | McBride | 310/50 |
| 4,835,410 * | 5/1989 | Bhagwat et al. | 307/64 |
| 4,908,538 * | 3/1990 | Geberth, Jr. | 310/59 |
| 4,974,475 | 12/1990 | Lord et al. | 81/57.13 |
| 5,386,970 | 2/1995 | Trant | 254/362 |
| 5,535,713 | 7/1996 | Braddock | 123/179 |
| 5,607,143 | 3/1997 | Regal | 254/342 |
| 5,664,634 * | 9/1997 | McCracken | 173/48 |

* cited by examiner

Primary Examiner—Elvin Enad
(74) Attorney, Agent, or Firm—Dennis T. Griggs

(57) ABSTRACT

A portable power tool provides operating torque for a rotary load. The portable power tool includes an offset rotary sleeve for coupling attachment to the power input shaft of the rotary load. A gearing assembly provides right angle torque transfer from an in-line D.C. motor. The gearing assembly is driven by an output power shaft which is powered by a DC electrical motor. The rotary sleeve coupling is supported on opposite ends by a first bearing on an upper portion of the rotary sleeve coupling and by a second bearing on a lower portion of the rotary sleeve coupling. The D.C. motor is powered by a rechargeable battery.

11 Claims, 11 Drawing Sheets

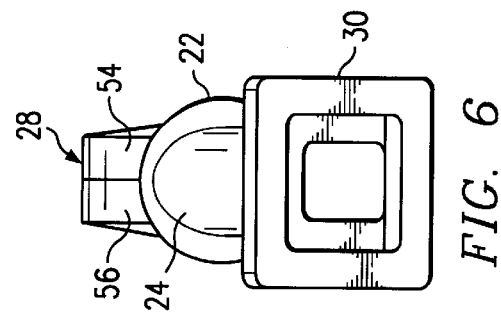
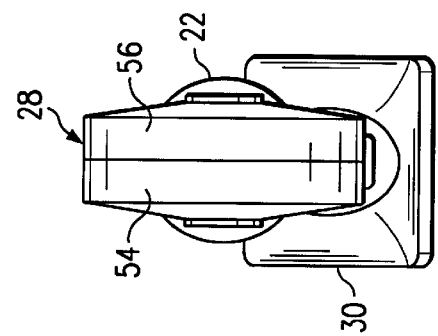
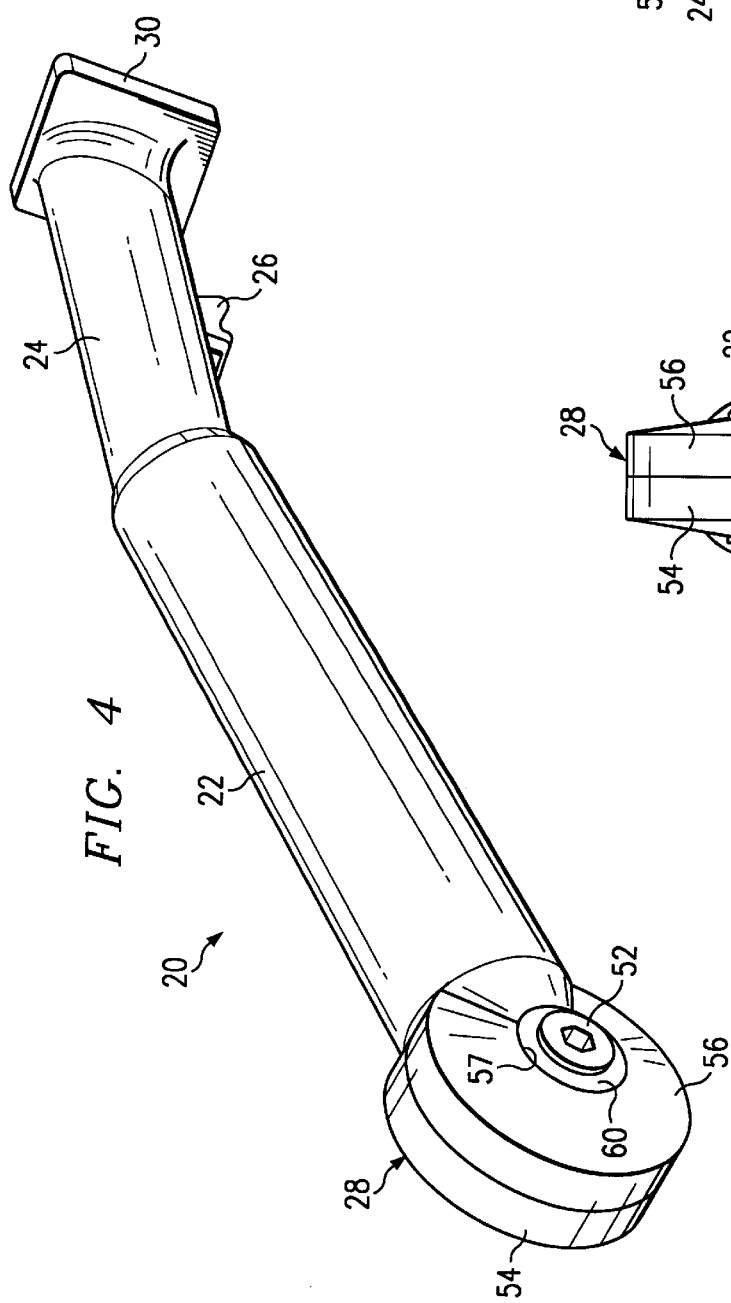

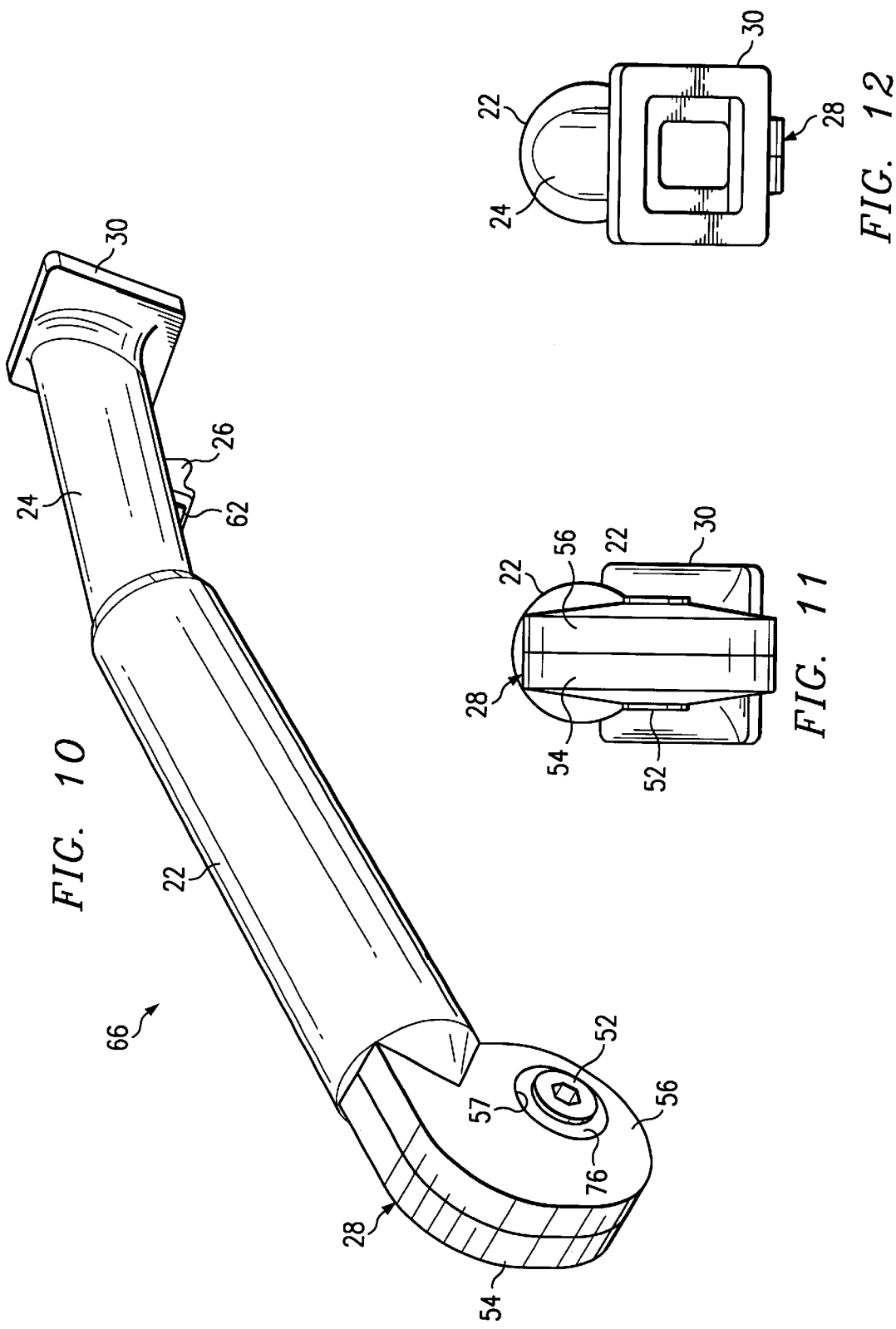

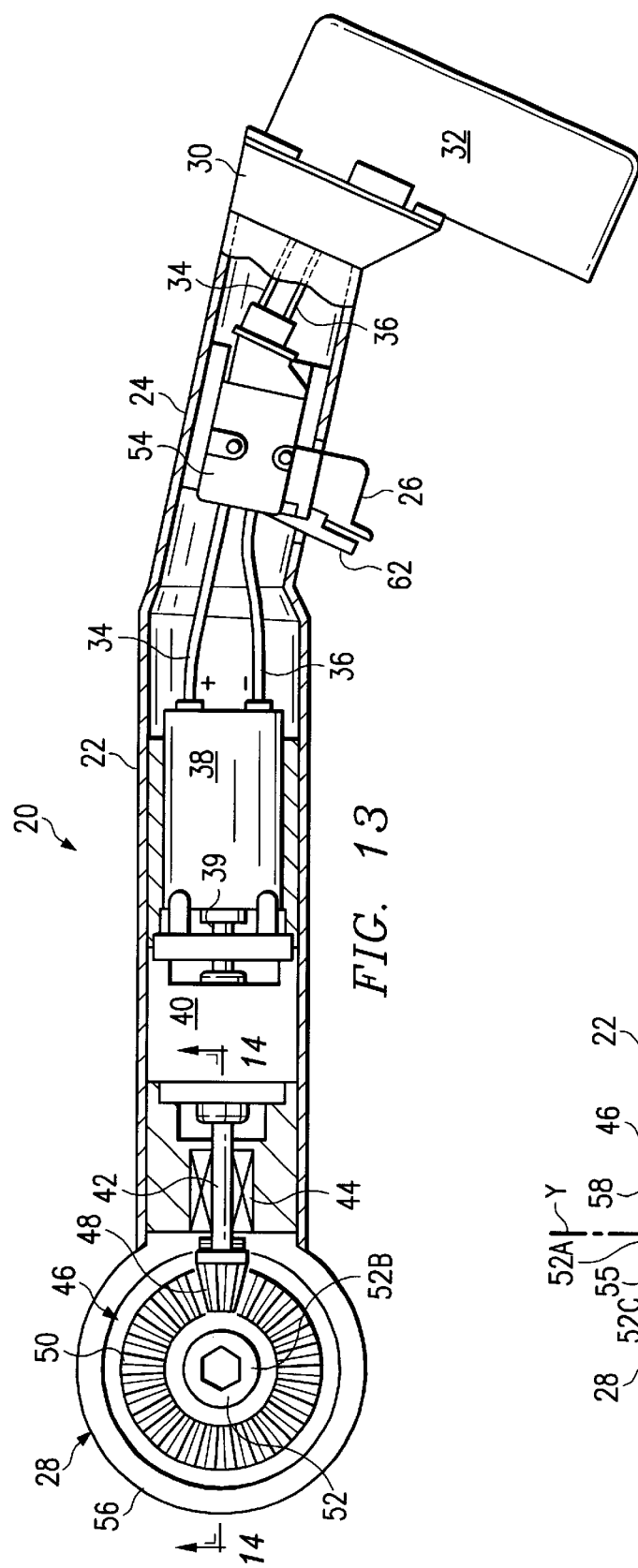
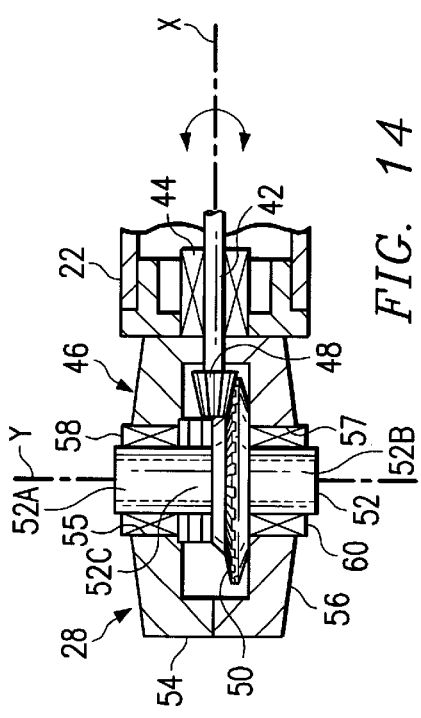
FIG. 13
FIG. 14

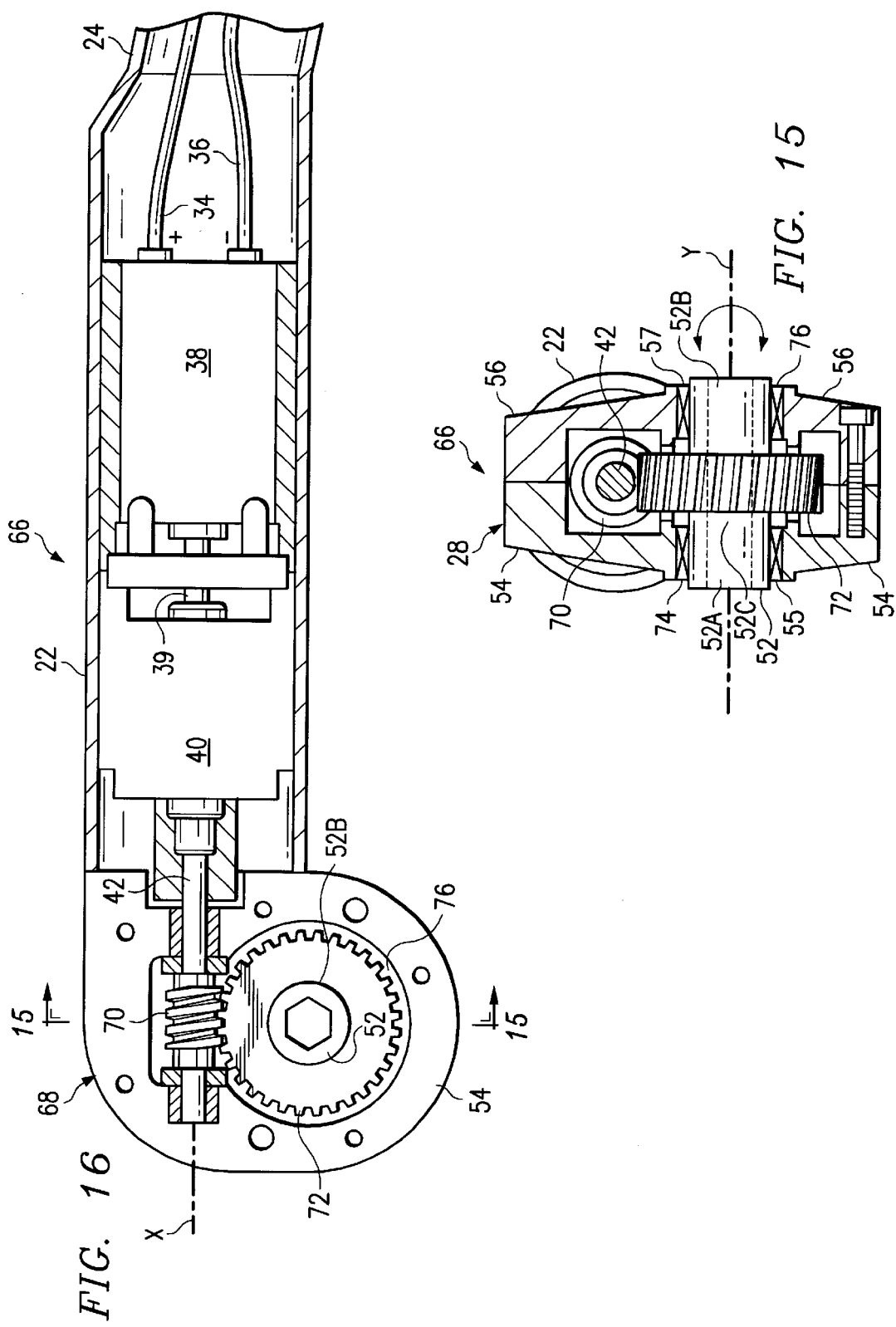

CORDLESS MULTI-PURPOSE HIGH TORQUE GENERATING ASSEMBLY

CROSS-REFERENCE TO RELATED APPLICATIONS

This application claims priority from the following applications:

U.S. application Ser. No. 09/048,516, filed Mar. 26, 1998.

STATEMENT REGARDING FEDERALLY SPONSORED RESEARCH OR DEVELOPMENT

Not applicable

BACKGROUND OF THE INVENTION

This invention is related generally to portable power tools, and in particular to a battery-powered torque wrench.

There are many tools available for providing a force (torque) that acts to drive a rotary load. Torque is required in a variety of applications such as turning a winch on a sailboat, a jack for lifting a car or truck, a trailer winch, a high torque drill bit, a high torque impact wrench and the like. Conventional heavy duty, high torque power drive tools are energized from a fixed power source, either electrical or mechanical, which limits portability. For example, some power tools use an extension power cable for connection to a remote electrical power outlet. In other power tools, heavy internal combustion engines are utilized. But those tools cannot be easily moved or handled. The connection to a fixed electrical power supply limits the useful range, and an internal combustion engine adds considerable weight and size to the power tool.

Such conventional power tools cannot be used in all applications. For example, in sailboats the sails are raised manually by a mechanical winch. The raising and lowering of the sails can be very tedious and laborious work. However, electrically powered winches are not practical in such applications that require an electrical cable to supply operating power from a compatible source. Motorized winches are much too large, heavy and expensive. Additionally, the size of a powered winch must be minimized for use within the limited deck space available on a sailboat.

In another example, a power tool may be needed when tightening and loosening nuts and bolts on heavy equipment and machinery. Conventional power tools are much too large or must be tethered to electrical power outlets, making them impractical for use in remote locations.

A conventional power tool is disclosed in U.S. Pat. No. 5,386,970 to Trant. According to Trant, a power handle for rotating the capstan of a manual winch includes a housing, a motor, a star stub for engaging and rotating the capstan relative to the housing, and a gear reduction unit for connecting the motor to the star stub. Additionally, the handle is connected by an electrical power cable to an electrical power supply. Trant does not disclose a completely portable power drive device since the Trant power tool must be energized from a remote power source through an electrical power cable.

Some conventional power tools utilize a rechargeable battery, for example cordless drills, screwdrivers and saws. However, those tools lack sufficient power to handle high torque, heavy duty power drive applications. Consequently, there is a continuing interest in providing a battery operated, high torque, portable power tool for use in confined areas or at a remote location where an electrical power supply is not readily available.

SUMMARY OF THE INVENTION

The portable power tool of the present invention includes a DC electric motor and a speed reduction assembly for providing torque to a rotary load. The speed reduction assembly includes a sleeve coupling for engaging and driving the load. The coupling sleeve is driven by a gearing system for rotating the rotary sleeve coupling and includes a first sleeve coupling portion and a second sleeve coupling portion. In one embodiment, the gearing system includes a first bevel gear meshing with a second bevel gear for rotating the sleeve coupling in a right angle offset power transmission arrangement. The second bevel gear is rigidly attached to the rotary coupling sleeve coupling, which is offset for turning a rotary load at a right angle with respect to the in-line power axis of the DC electric motor. In a second embodiment, the gearing system includes a worm gear and a driven gear rigidly attached to the rotary sleeve coupling.

The output shaft of the speed reduction assembly is coupled in axial alignment with the output shaft of the DC electric motor. Additionally, the output shaft of the drive reducer is coupled in torque transfer engagement with the output shaft of the speed reducer, but extends orthogonally with respect thereto. This offset torque transfer arrangement makes possible the efficient transfer of torque through a rotary coupling that extends substantially at a right angle and laterally to either side of the main drive axis of the electric drive motor. This offset arrangement can be used advantageously for many applications where a conventional in line torque transfer tool (for example as shown in U.S. Pat. No. 5,386,970) would require an adapter to perform the same job.

The offset torque transfer arrangement of the present invention includes a first bearing supporting the first sleeve coupling portion of the rotary sleeve coupling and a second bearing supporting the second sleeve coupling portion. In addition, the portable power tool includes a first bearing support member having a first opening that surrounds and supports the first bearing and a second bearing support member having a second opening surrounding and supporting the second bearing.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

FIG. 4 is a side perspective view thereof;

FIG. 5 is a front elevation view thereof;

FIG. 6 is a rear elevation view thereof;

FIG. 10 is a side perspective view thereof;

FIG. 11 is a front elevation view thereof;

FIG. 12 is a rear elevation view thereof;

FIG. 13 illustrates a cut-away view thereof;

FIG. 14 is a cut-away view of the head module and the output power shaft taken along the line 14—14 of FIG. 13;

FIG. 15 is a cut-away view of the worm gear and the driven gear taken along the line 15—15 of FIG. 16;

FIG. 16 is a cut-away view of the main housing and the head module in the second embodiment of the present invention;

DETAILED DESCRIPTION OF THE INVENTION

Figure 1:
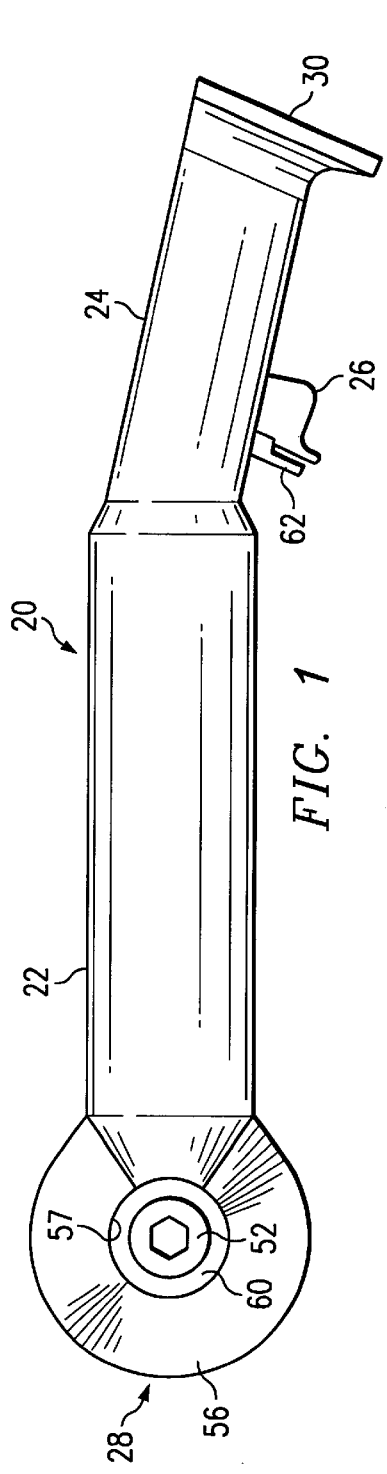
FIG. 1 is a side elevation view of a portable power tool according to a first embodiment of the present invention.
Figure 2:
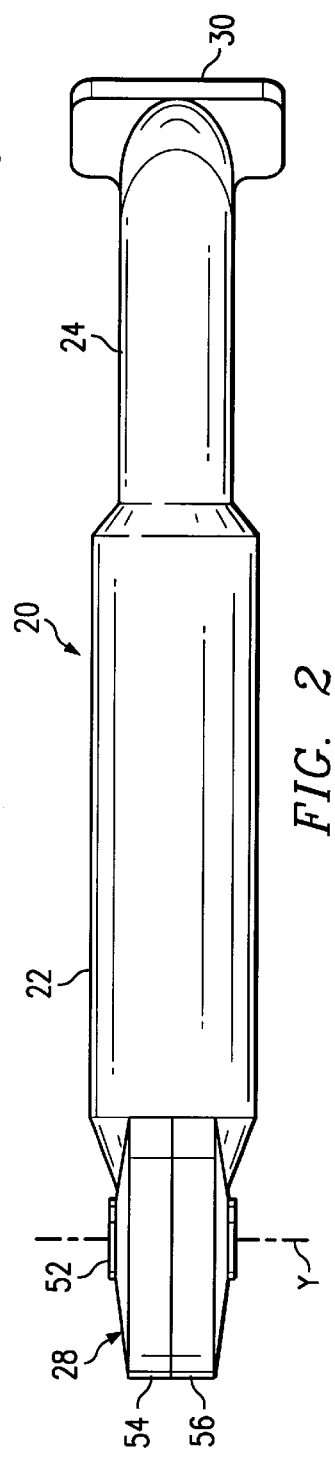
FIG. 2 is a top plan view thereof.
Figure 3:
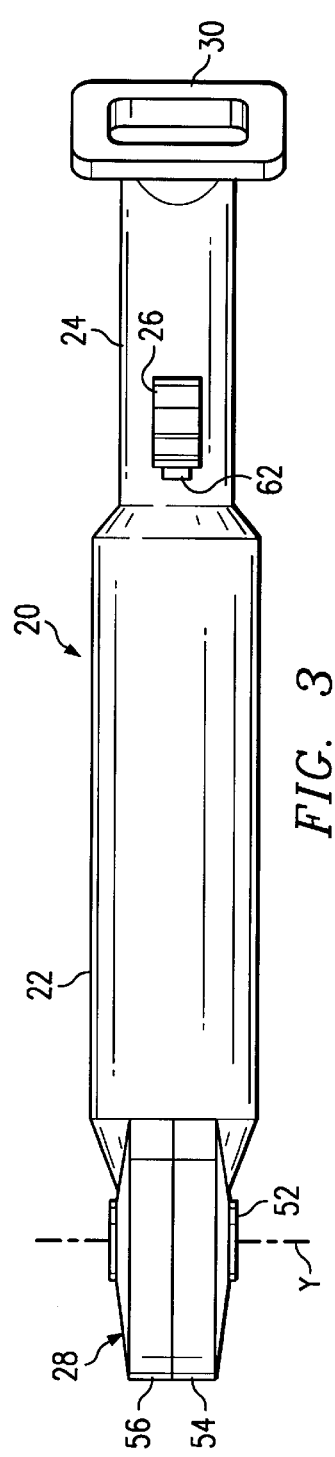
FIG. 3 is a bottom plan view thereof.
Figure 7:
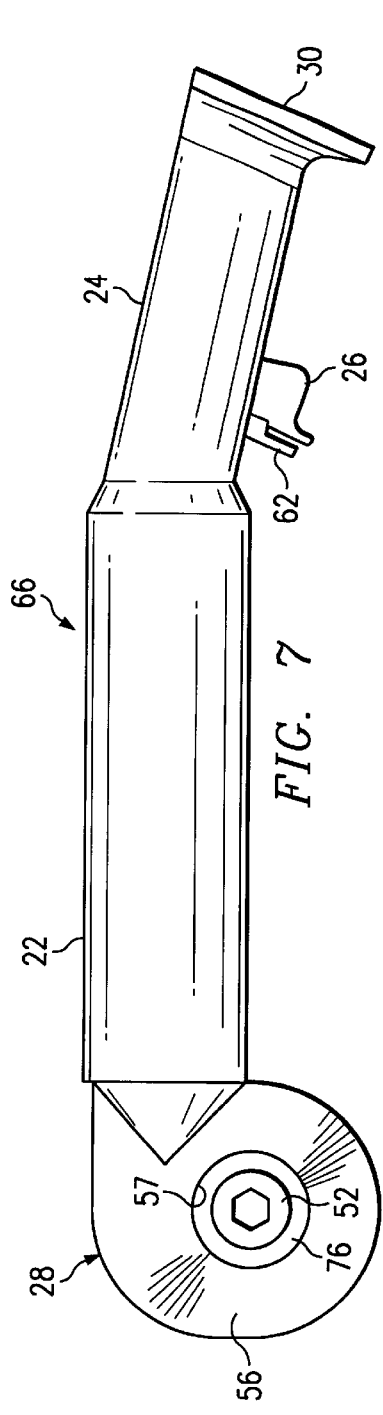
FIG. 7 is a side elevation view of a portable power tool according to a second embodiment of the present invention.
Figure 8:
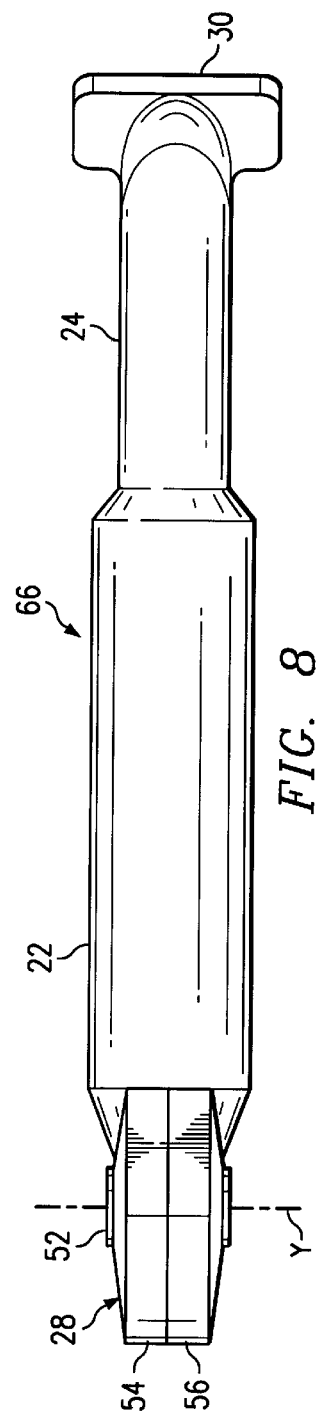
FIG. 8 is a top plan view.
Figure 9:
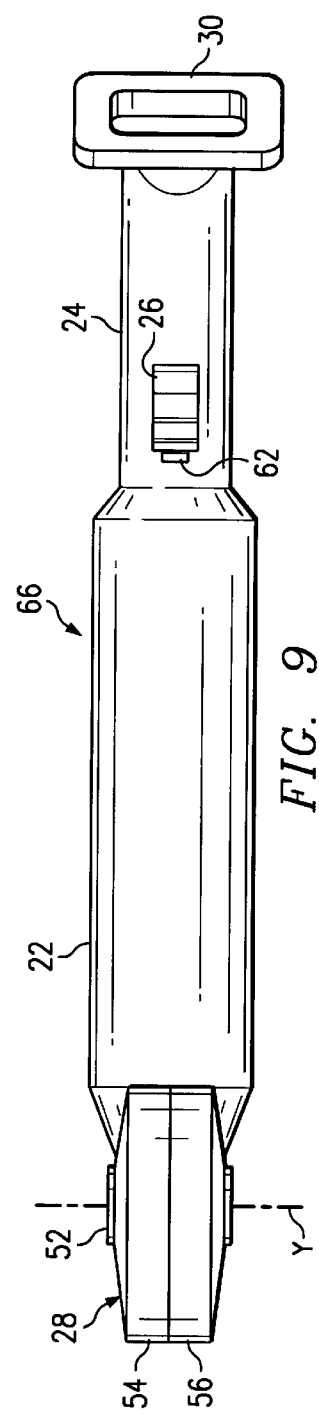
FIG. 9 is a bottom plan view thereof.

Preferred embodiments of the invention will now be described with reference to various examples of how the invention can best be made and used. Like reference numerals are used throughout the description and several views of the drawing to indicate like or corresponding parts.

FIG. 1 illustrates a side elevation view of a portable power tool 20 constructed according to a first prefer red embodiment of the present invention. The portable power tool 20 includes a main housing 22, a handle 24, a trigger assembly 26, a head module 28, and a battery receptacle 30.

Referring to FIG. 13, a battery 32 is attached to the battery receptacle 30. The battery is preferably a rechargeable 18 VDC battery such as those commonly used in other portable power tools (e.g., cordless drills and screw-drivers).

Terminal conductors 34 and 36 are connected to the battery 32 at the receptacle 30. The terminal conductors 34 and 36 provide positive and negative D.C. voltage to a stator winding of a motor 38 located within the main housing 22. In the preferred embodiment of the present invention, the motor 38 is energized by 18 VDC and is rated at 2/10 horsepower (150 watts) or 2.4 kilo calories/min. at 19,500 rpm.

The motor 38 includes a rotor output shaft 39 connected to a two-speed planetary gear reduction assembly 40 with speed reduction ratios of about 14:1 and 43:1. The planetary gear drives an output power shaft 42 located on an upper end of the main housing 22 between the motor 38 and the head module 28. The output power shaft 42 is supported by a bearing 44 allowing rotation about an X axis (longitudinal) of the output shaft 42. In low speed operation, the gear reduction ratio is preferably 14:1. With this ratio, the motor 38 produces 3,300 inch-pounds (38 m-kgs) of torque at a gear reduction output speed of 120 rpm.

The output power shaft 42 is terminated by a bevel gearing system 46. The bevel gearing system 46 includes a bevel gear 48 rigidly attached to the output power shaft 42 and a bevel gear 50. Both the bevel gear 48 and the bevel gear 50 have teeth which mesh with one another for transmitting rotary motion from one shaft to another. The bevel gear 48 is essentially in line with the bevel gear 50. Rotation of the output shaft 42 provides rotation of the bevel gear 48. The bevel gear 50 is rigidly attached to a rotary sleeve coupling 52. The rotary sleeve coupling 52 is fitted within a longitudinal bore located within the center of the bevel gear 50. The bevel gear 50 and the rotary sleeve coupling rotate about a Y axis which is perpendicular to the longitudinal axis X of the output power shaft 42.

FIG. 14 is a cut-away view of the head module 28 and the output power shaft 42 in the preferred embodiment of the present invention. The head module 28 includes an upper bearing support member 54 and a lower bearing support member 56. The upper bearing support member 54 includes an opening 55 which supports an upper bearing 58. The upper bearing 58 surrounds an upper portion 52A of the rotary sleeve coupling 52, allowing rotation of the bevel gear 50 about the Y axis. The upper bearing support member 54 supports the upper bearing 58 above the bevel gear 50.

The lower bearing support member 56 is constructed similar to the upper bearing support member 54. The lower bearing support member 56 has an opening 57 which surrounds a lower bearing 60. The lower bearing 60 surrounds a lower portion 52B of the rotary sleeve coupling 52, allowing the rotation of the bevel gear 50 about the Y axis. The lower bearing support member 56 supports the lower bearing 60 below the bevel gear 50. According to this arrangement, the bevel gear 50 is attached to an intermediate body portion 52C of the rotary sleeve coupling 52 between the upper bearing 58 and the lower bearing 60.

As the bevel gear 48 is driven by the output power shaft 42, the bevel gear 50 rotates about the Y axis. The rotation of the bevel gear 50 rotates the rotary sleeve coupling 52. The rotary sleeve coupling 50 may then be attached to the input shaft of a rotary load. In the preferred embodiment, an adapter (not shown) is inserted into the rotary sleeve coupling 50 to accommodate different shaft sizes.

The bevel gearing assembly 46 transmits the torque from the X axis to the Y axis. The unique bearing arrangement, located on opposite sides of the bevel gear 50, provides a powerful means for transmitting the torque from the in-line X axis to the offset Y axis.

Referring again to FIG. 13, the trigger assembly 26 includes a trigger switch 62 connected to a switch 64 within the handle 24. In the preferred embodiment of the present invention, the trigger switch 62 is used as a three position switch to turn the portable power drive on and off. The third position of the trigger switch 62 reverses the direction of rotation of the output power shaft 42, thereby reversing the rotation of the rotary sleeve coupling 52. By positioning the trigger switch to the on or reverse position, the switch 64 is actuated, thereby allowing current from the battery 32 to power the motor 38.

Referring to FIGS. 13 and 14, the operation of the portable power tool 20 will now be explained. Prior to use of the portable power tool 20, the battery 32 is charged in a separate recharging unit connected to an electrical supply (not shown). Once charged, the battery 32 is inserted into the battery receptacle 30. The portable power tool 20 is attached to the rotary load shaft of an equipment, such as a winch. The operator then actuates the portable power tool 20 by depressing the trigger switch 62 to the on position.

The actuation of the trigger switch 62 allows the switch 64 to connect current from the battery 32 to the motor 38 through the terminal conductors 34 and 36. The motor 38 then begins to drive the output power shaft 42 along the in-line X axis. The rotation of the output power shaft 42 results in the rotation of the bevel gear 48. The bevel gear 48 drives the bevel gear 50, causing the bevel gear 50 to rotate about the offset Y axis. Rotation of the bevel gear 50 drives the rotation of the shaft of the object within the rotary sleeve coupling 52.

If rotation about the offset Y axis is desired in reverse, the operator actuates the third position on the trigger switch 62.

The switch then reverses the current flow to the motor 38, resulting in the motor 38 driving the output power shaft 42 in the opposite direction. This reverse rotation is translated to the bevel gear 48 which turns the bevel gear 50 in the opposite direction about the Y axis.

FIG. 16 is a cut-away view of the main housing 22 and the head module 28 in an alternate embodiment of the present invention. A portable power tool 66 of this alternate embodiment uses a different gearing arrangement for rotating the sleeve coupling 50. However, all other components described for the portable power tool 20 remain the same for the portable power tool 66. The portable power tool 66 includes a worm gear system 68 which includes a worm gear 70 and a driven gear 72. The worm gear 70 has a single spiral ridge which meshes with the driven gear 72. The driven gear 72 is offset to enable the meshing of the worm gear 70 with the driven gear 72, and provides a speed reduction of 10:1 on the driven gear 72. As a result, an overall 140:1 or a 430:1 output shaft to motor speed reduction is provided by this arrangement. This corresponds to an output torque ratio of 1:1090 in-lbf (1:12.6 m-kgs) in high speed operation or 1:3300 in-lbf (1:38 m-kgs) in low speed operation as calculated from the motor to the output shaft.

When the motor 38 is actuated, the motor 38 rotates the output power shaft 42 about the in-line X axis. Attached to the terminal end of the output power shaft 42 is the worm gear 70. Rotation of the output power shaft 42 results in the turning movement of the worm gear 70. The driven gear 72 is rigidly attached to the rotary sleeve coupling 52.

FIG. 15 is a cut away view of the worm gear 70 and the driven gear 72 in the alternative embodiment of the present invention. As the worm gear 70 rotates, the spiral tooth of the worm gear 70 turns the driven gear 72 in a rotation about the offset Y axis. As discussed above, the upper bearing support member 54 has an opening that surrounds an upper bearing 74. The upper bearing 74 surrounds an upper portion of the rotary sleeve coupling 52. Additionally, the upper bearing support member 54 supports the upper bearing 74 above the driven gear 72.

The lower bearing support member 56 also has an opening which surrounds a lower bearing 76. The lower bearing 76 surrounds a lower portion of the rotary sleeve coupling 52, which allows the driven gear 72 to rotate about the offset Y axis. The lower bearing support member 56 supports the lower bearing 76 below the driven gear 72. As with the bevel gearing system 46, the worm gear system 68 transmits the torque from the in-line X axis to the offset Y axis. The unique bearing alignment, present in both the bevel gearing system 46 and the worm gear system 68, provides an efficient means for transmitting the torque output from the X axis to the Y axis.

Referring to FIGS. 15 and 16, the operation of the portable power tool 66 will be described. A shaft of a rotary load to be driven by the portable power tool 66 is inserted into the rotary coupling sleeve 52. In similar fashion to the portable power tool 20, the portable power tool 66 is selectively energized by the trigger switch 62. The motor 38 then drives the output power shaft 42, causing the rotation of the worm gear 70. The worm gear 70 drives the rotation of the driven gear 72 about the offset Y axis.

INDUSTRIAL APPLICABILITY

The portable power tool of the present invention provides many benefits. First, it is portable, with a small, lightweight rechargeable battery power supply removably attached to the power handle housing. Second, since a re-chargeable battery is utilized, the size of the portable power tool is minimized for use in small areas. Third, through the use of the novel alignment of the bearings and offset gearing arrangements described above, the portable power tool provides an efficient transfer of torque from the in-line axis to an offset axis.

Figure 17:
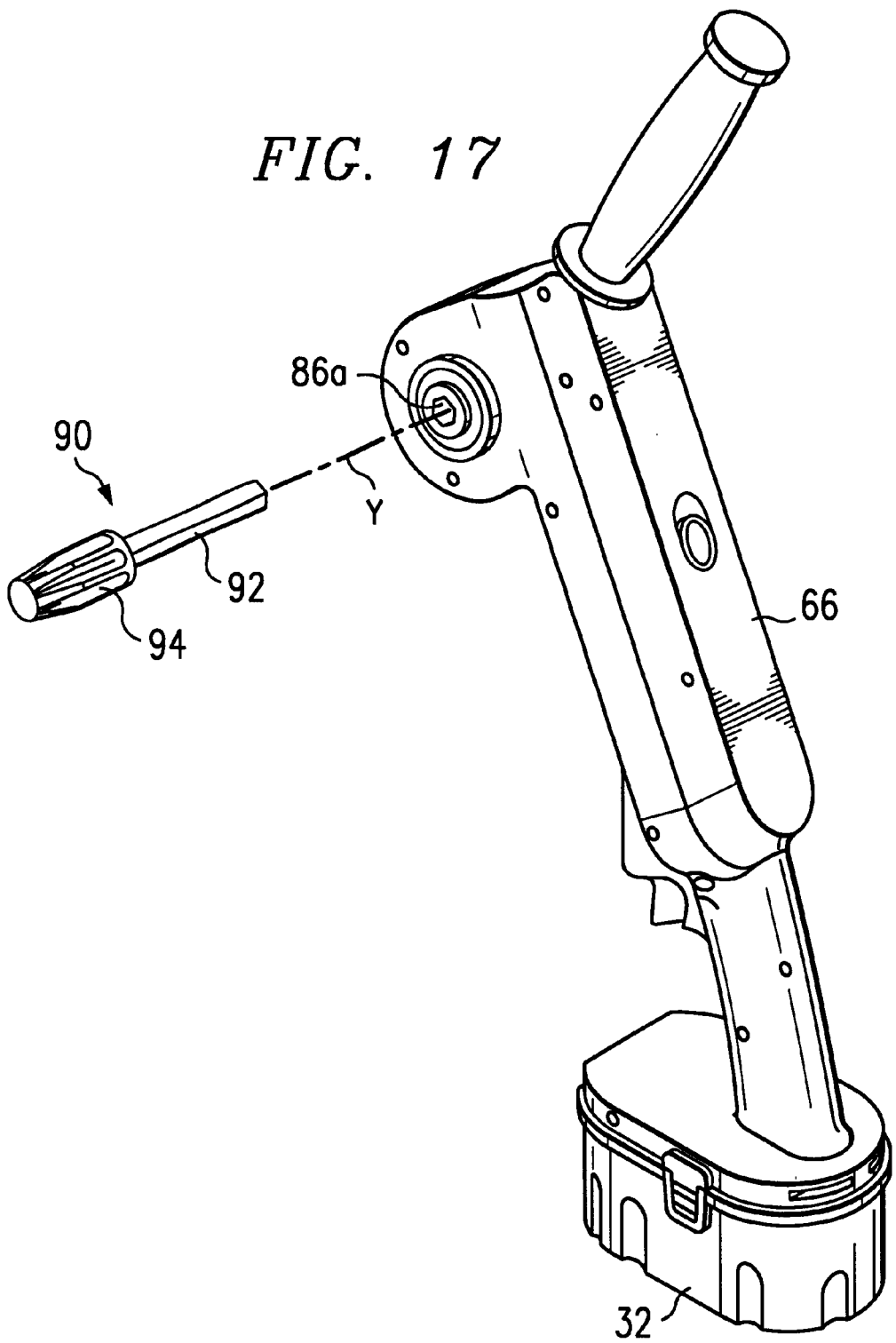
FIG. 17 illustrates a perspective view of my high torque power tool as used for rotating a winch on a sailboat.

In one application, the high toque drive tool 66 of my invention is used to turn a winch on a sailboat. As shown in FIG. 17, the power tool is provided with a star-shaped male adapter 90 which can be inserted at a shaft end 92 into the female shaft adapter opening 86a of my high torque power tool 66. A star-shaped male shaft 94 is inserted into the star-shaped female opening of a conventional winch. Rotation of the star-shaped female opening on the winch by the star-shaped male shaft 94 driven by the switch activated DC electric motor through the speed reducer and drive reducer 70 causes the winch on the sailboat to rotate at the high torque levels required to manipulate the lines on a sailboat.

Figure 18:
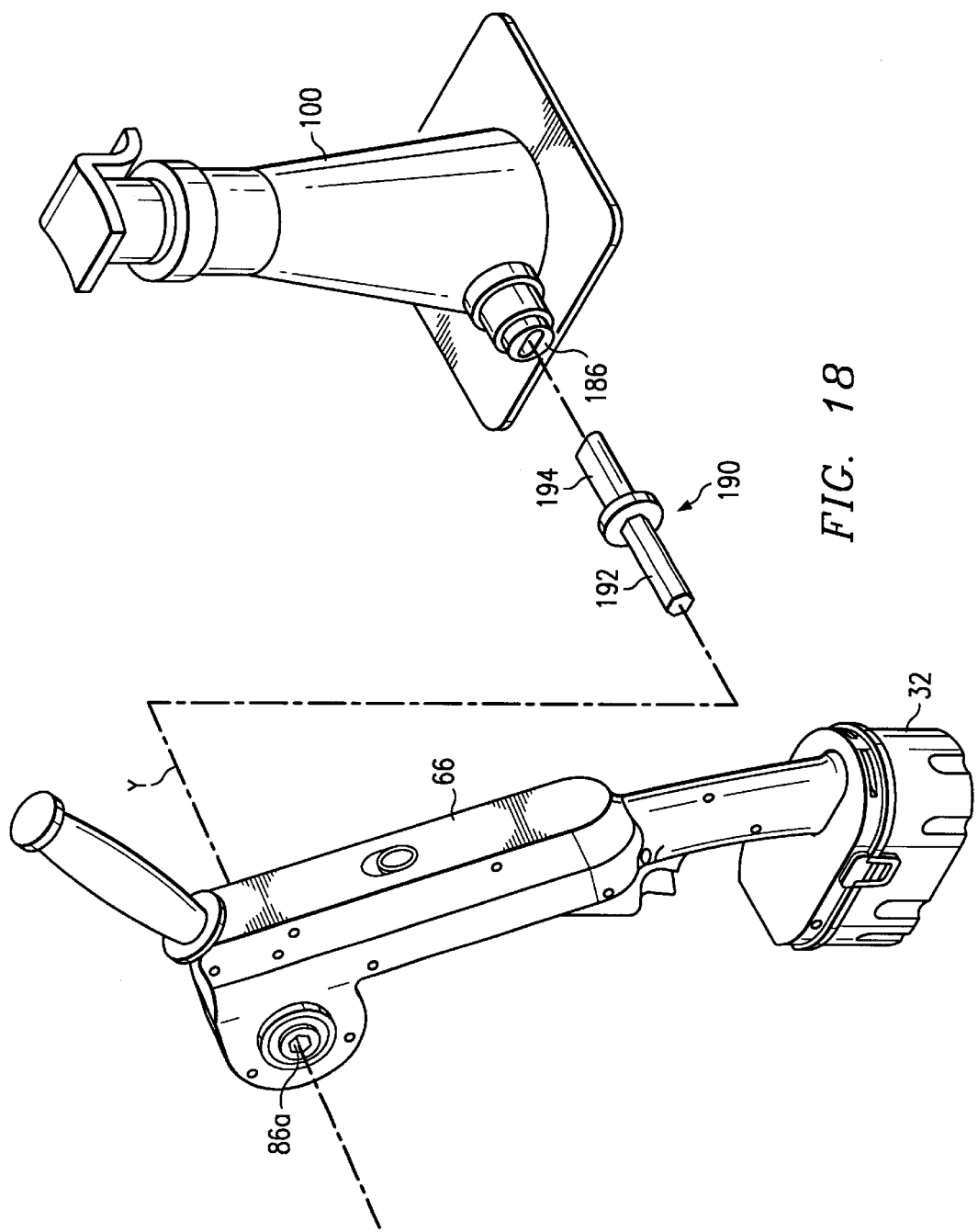
FIG. 18 is a perspective view of my high torque power tool as used for operating an automobile jack.

In another application shown in FIG. 18, my high torque power tool 66 is used to turn a screw type bottle jack 100 in order to lift a car or truck to change a tire. The jack 100 has a rotatable coupling 186. A jack adapter 190 has a shaft end 192 which is insertable into opening 86a of the high torque power tool 66. At a second end 194, the jack adapter 190 is insertable into opening 186 on the jack 100. Rotation of the coupling 186 on the jack 100 by the jack adapter 190 causes the jack to extend vertically in response to the high torque applied to lift the car or truck to change the tire. While use of my invention with a screw type bottle jack has been described, it will be appreciated that my high torque power tool 66 can be used with a scissors jack or hydraulic pump jack that requires a rotating power source.

Figure 19:
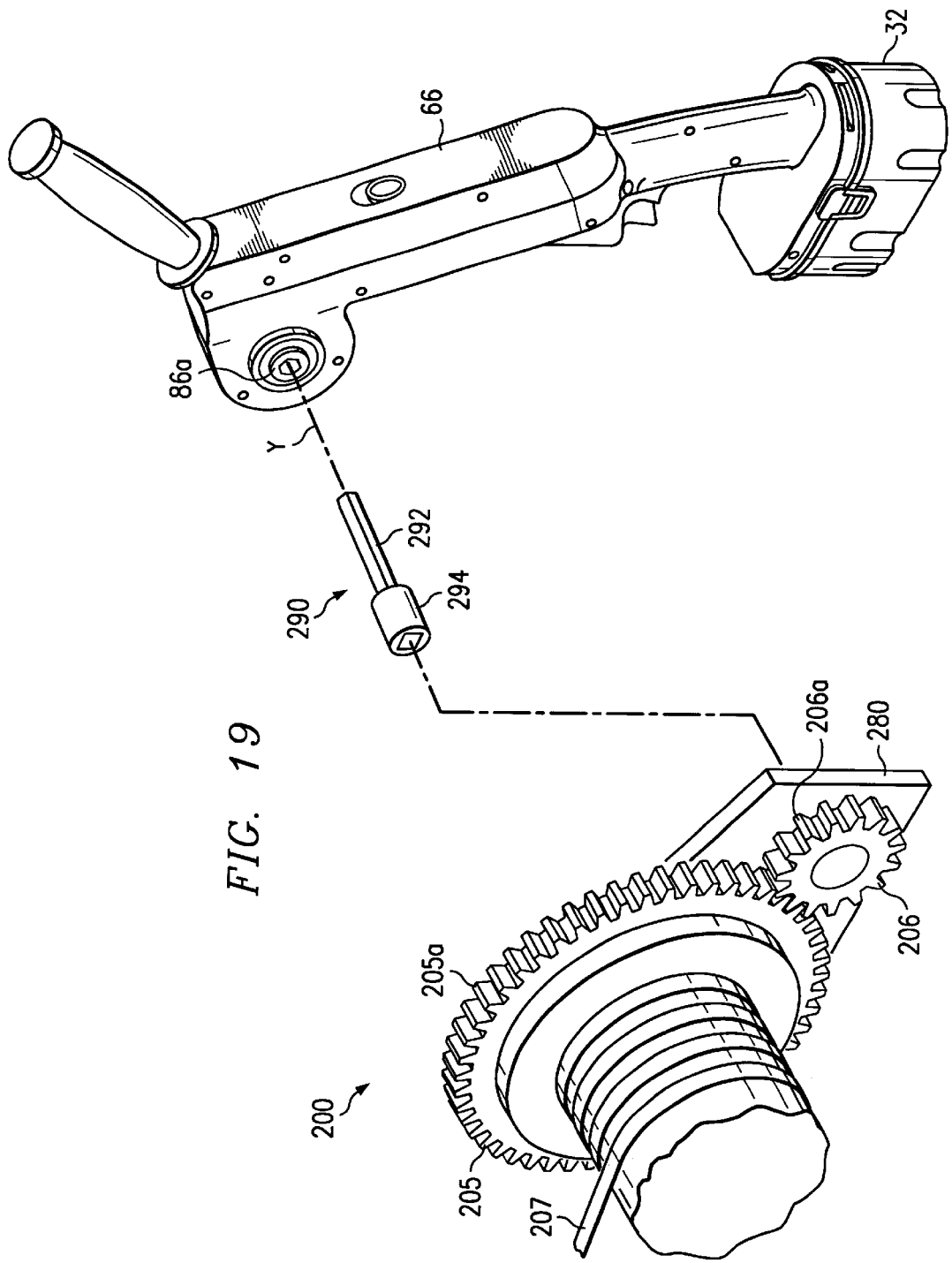
FIG. 19 is a perspective view which illustrates the use of my portable power tool for driving a trailer winch.

In another application shown in FIG. 19, my power tool 66 is used to drive a trailer winch 200. The trailer winch 200 is a stationary hoisting attached to a trailer having a drum 205 around which is wound a rope or a chain 207 which can be fastened to an object to be pulled or hoisted. The trailer winch 200 has a rotatable pinion gear 206 which is attached to an outwardly extending power input shaft (not shown). The pinion gear has teeth 206a that mesh in driving engagement with teeth 205a of drum 205. An adapter 290 is provided with a shaft 292 which can be inserted into the female opening 86a of the high torque power tool 66. The adapter 290 is also provided with a socket 294 which can receive an outwardly extending power. Rotation of gear 206 on the trailer winch 200 by the adapter 290 causes the drum 205 to rotate under the action of the high torque as required to wind or unwind rope or chain 207, thereby causing a load connected to the free end of the rope or chain 207 to be hoisted or lowered with respect to the trailer winch assembly.

Figure 20:
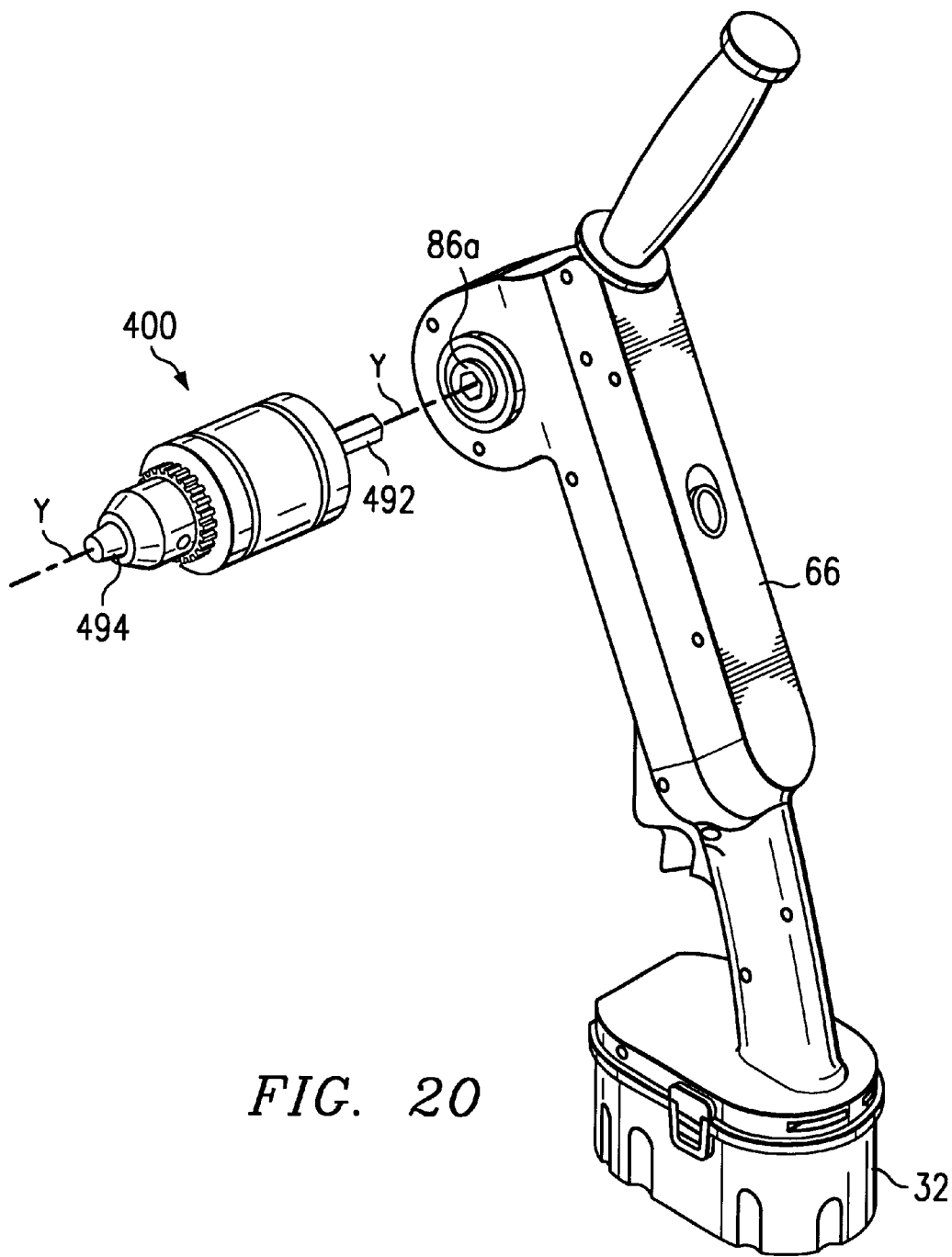
FIG. 20 is a perspective view of my high torque power tool as used for driving a high torque drill chuck; and, FIG. 21 is a perspective view of my high torque power tool as used for driving a high torque impact wrench.

In FIG. 20 is shown yet another application of my invention where the high torque power tool 66 is used to drive a drill chuck 400. In this arrangement, a shaft 492 of drill chuck 400 is insertable within the female opening 86a of the high torque power tool 66 in a torque transmitting engagement. Means for locking shaft 492 to opening 86a can be adapted to opening 86a or shaft 492 to provide an even tighter fit between shaft and opening. A mouthpiece 494 of a drill chuck 400 is adapted to receive a drill or other bit. Rotation of chuck 490 causes the drill bit to be rotated under the action of the high torque as required to perform the drilling operation.

Figure 21:
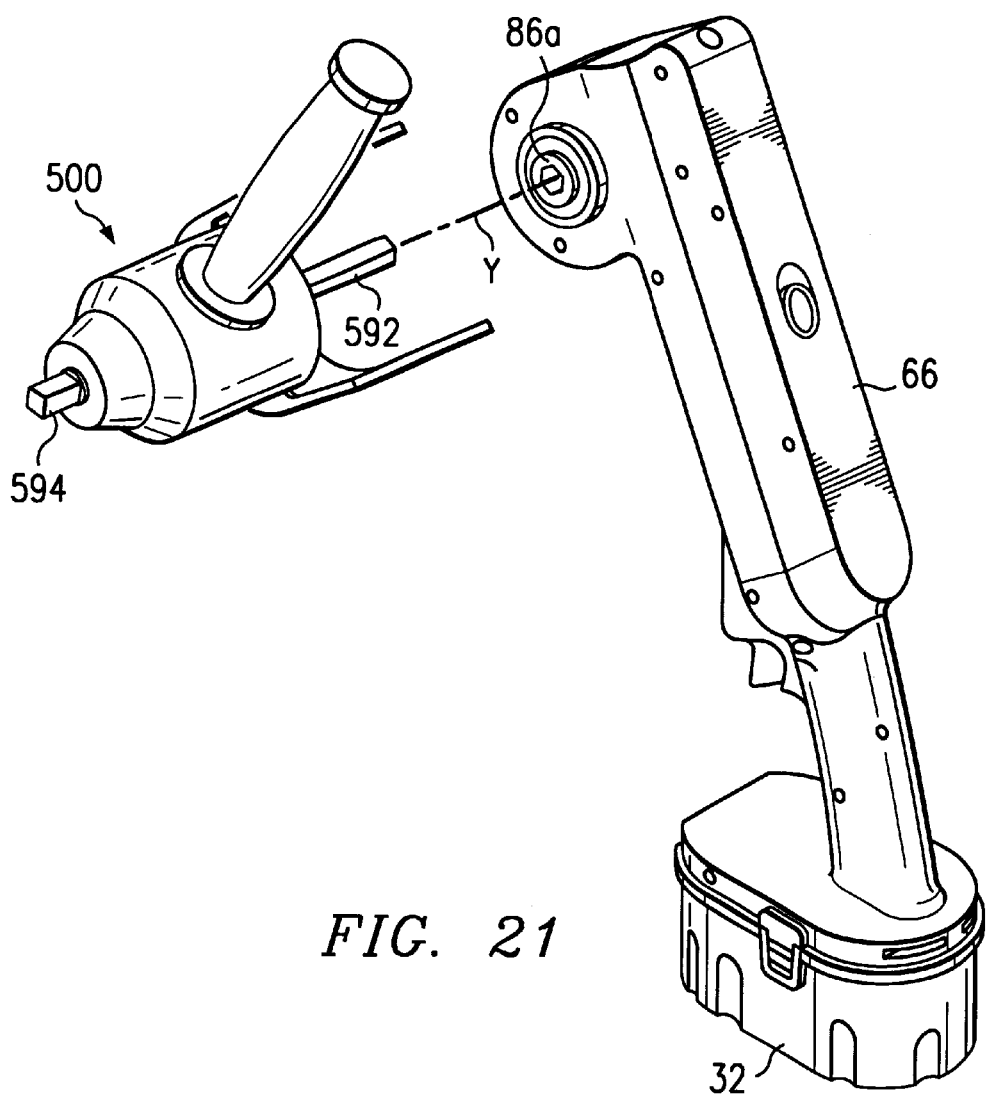

In FIG. 21 is shown still another application of my invention where the high torque power tool 66 is used to drive an impact wrench 500. In this arrangement, the power input shaft 592 of the impact wrench 500 is received within the female opening 86a of the high torque power tool 66. Means for locking shaft 592 within the opening 86a can be adapted to opening 86a or shaft 592 to provide an even tighter fit between shaft and opening. Shaft 594 of the impact wrench 500 is adapted to receive a socket wrench (not shown). Rotation of the shaft 594 of impact wrench 500 causes the impact wrench shaft 594 to be rotated under the action of high torque.

One particularly desirable use for my invention is to turn a lug nut on a car or other vehicle. Lug nuts are typically used to mount a tire to a wheel mount on the car. A bar with a lug nut socket is typically used to break these lug nuts to remove the lug nuts or to tighten these lug nuts as the case may be in order to remove the tire from the vehicle. Lug nuts can be difficult to break especially if they mounted by a vehicle shop using an air compressor socket tool. For a motorist experiencing a flat tire on the road, the difficulty in breaking the lug nuts can be a problem and may even prevent the motorist from changing the flat tire. With my high torque power tool, which because of its portability can easily be carried in a vehicle, breaking the lug nuts is no longer a problem. Of course, an appropriate adapter having a lug nut socket on one end and adaptable to my high torque power tool on the other end would be needed for this application. Moreover, my high torque power tool replaces the manual lug nut socket that is provided in most vehicles for tire changing purposes.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. A portable power tool for applying torque to a rotary load, the portable power tool comprising:
    a torque sleeve including a first end coupling portion for engaging a rotary load, a second end coupling portion for engaging a rotary load and an intermediate body portion;
    a gearing assembly connected to the intermediate body portion for rotating the torque sleeve in alignment with a load axis;
    a first bearing member supporting the first end coupling portion for rotation in alignment with the load axis;
    a second bearing member supporting the second end coupling portion for rotation in alignment with the load axis;
    a D.C. electrical motor including a power output shaft; and,
    torque transfer apparatus including a torque input shaft coupled in torque transfer engagement with the power output shaft of the D.C.

2. A portable power tool as set forth in claim 1, wherein the gearing assembly comprises a first bevel gear meshed with a second bevel gear, the first bevel gear is attached to the intermediate sleeve coupling portion and the second bevel gear is attached to the output power shaft.

3. A portable power tool as set forth in claim 1, further comprising a third bearing supporting the torque output shaft.

4. A portable power tool as set forth in claim 1, including a D.C. battery power pack electrically coupled to the electrical motor.

5. A portable power tool as set forth in claim 1, further comprising a handle and a trigger switch mounted on the handle, the trigger switch being electrically coupled to the motor for selectively applying electrical power to the motor.

6. A portable power tool as set forth in claim 1, wherein the trigger switch is a three position switch providing reversal of the motor.

7. A portable power tool as set forth in claim 1, further comprising a gear reduction assembly coupled between the motor and the torque output shaft.

8. A portable power tool as set forth in claim 1, wherein the gearing assembly is a worm gear assembly including a driven gear meshed with a worm gear, and the driven gear is attached to-the intermediate coupling portion.

9. A portable power tool for applying torque to a rotary load, the portable power tool comprising:
    a rotary sleeve coupling including a first end portion, a second end portion, and a body portion disposed between the first end portion and the second end portion;
    a gearing assembly coupled to the body portion for rotating the rotary sleeve coupling;
    a first bearing supporting and surrounding the first end portion of the rotary sleeve coupling;
    a second bearing supporting the second end portion of the rotary sleeve coupling;
    a first bearing support member having a first opening, the first bearing being disposed within the first opening and supported by the first bearing support member;
    a second bearing support member having a second opening, the second bearing being disposed within the second opening and supported by the second bearing support member;
    a power shaft coupled to the gearing assembly;
    a DC motor coupled to the power shaft for rotating the gearing assembly; and
    a battery pack removably coupled to the DC motor for supplying operating power to the motor.

10. A portable power tool as set forth in claim 9, wherein the gearing assembly is a bevel gearing system including a first bevel gear connected to the rotary sleeve body portion and a second bevel gear disposed in mesh engagement with the first bevel gear, and the second bevel gear is coupled to the output power shaft.

11. A portable power tool as set forth in claim 9, wherein the gearing assembly is a worm gear assembly including a driven gear attached to the rotary sleeve body portion and a worm gear disposed in mesh engagement with the driven gear, and the worm gear also is coupled to the output power shaft.

* * * * *

UNITED STATES PATENT AND TRADEMARK OFFICE
CERTIFICATE OF CORRECTION

PATENT NO. : 6,218,746 B1
DATED : April 17, 2001
INVENTOR(S) : Lloyd V. Gouge Jr.

Page 1 of 1

It is certified that error appears in the above-identified patent and that said Letters Patent is hereby corrected as shown below:

Column 7, claim 1,
Line 57, after "D.C." insert -- electrical motor, and including a torque output shaft coupled in torque transfer engagement with the gearing assembly. --

Signed and Sealed this

Eighteenth Day of December, 2001

Attest:

Attesting Officer

JAMES E. ROGAN
Director of the United States Patent and Trademark Office